United States Patent Office 2,880,037
Patented Mar. 31, 1959

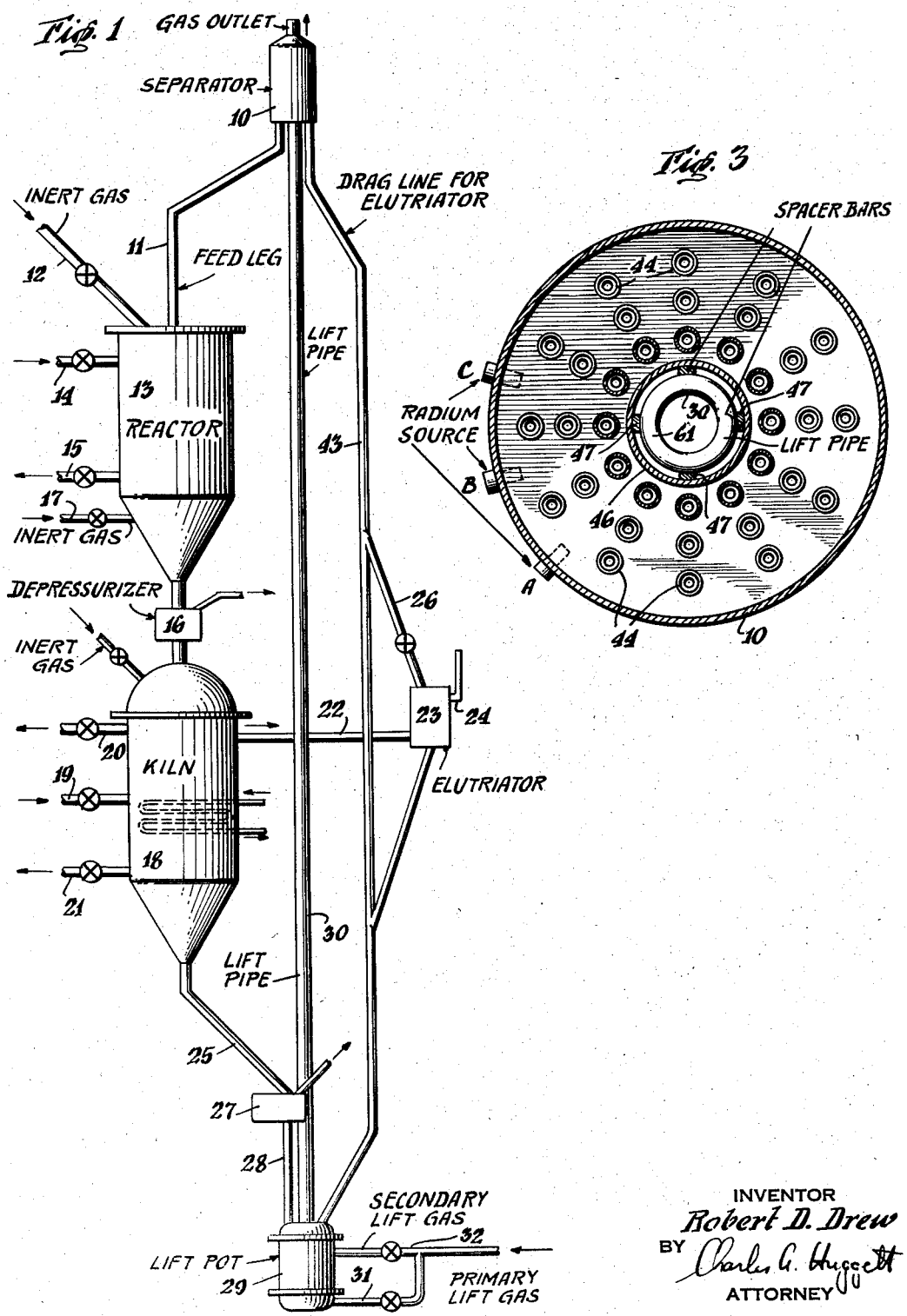

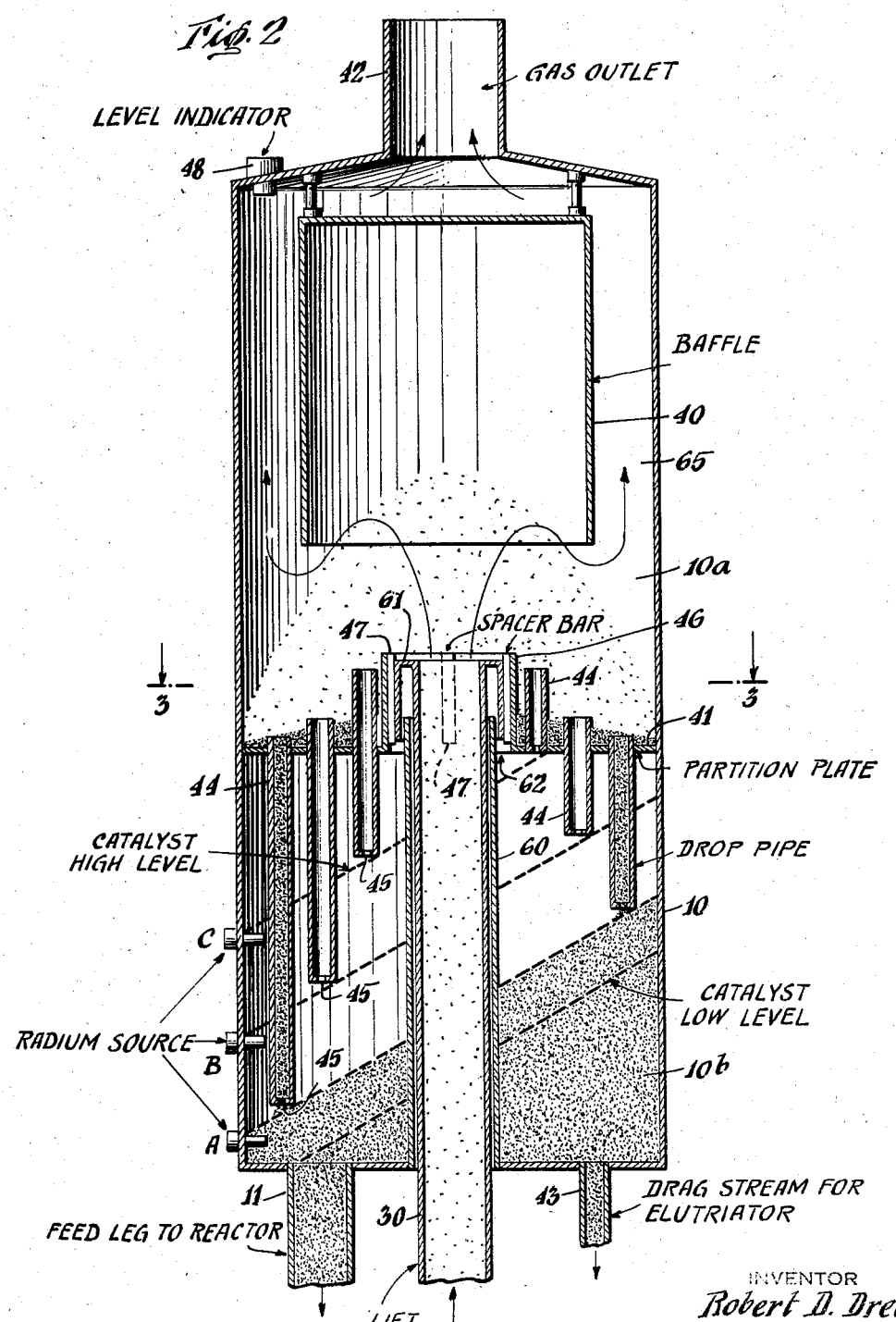

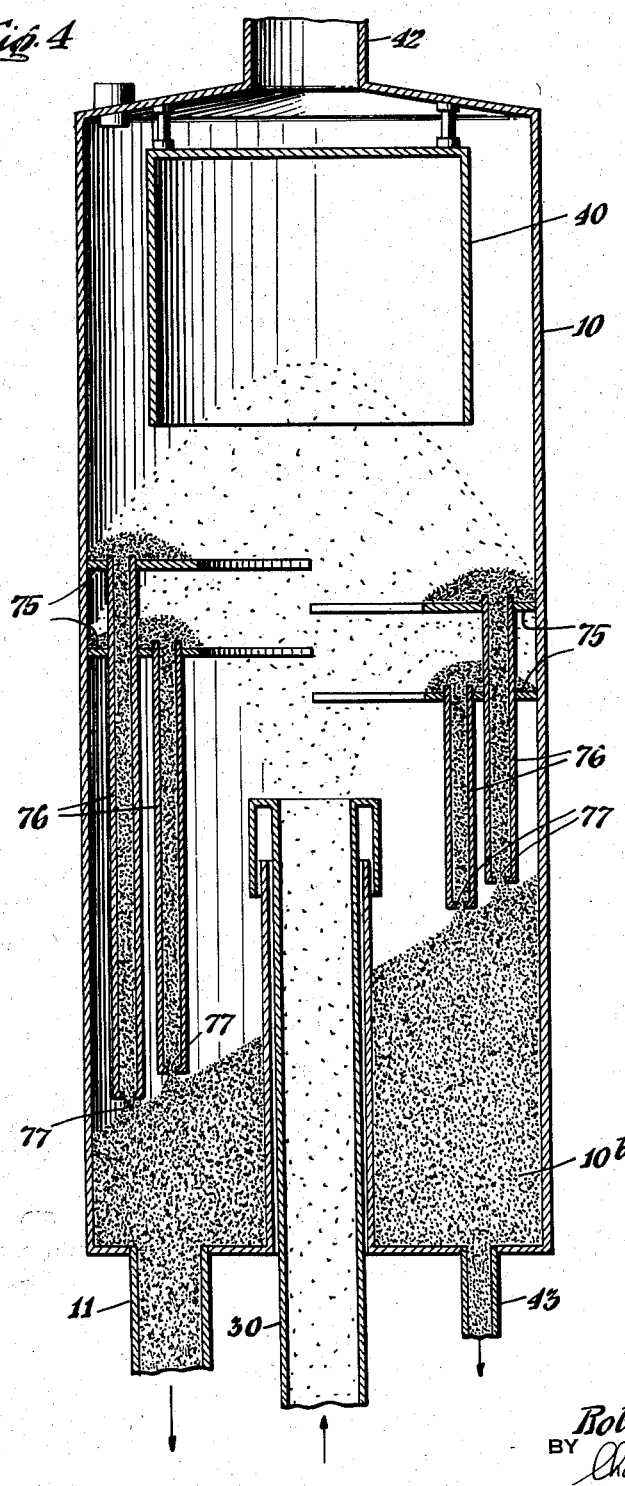

2,880,037

HYDROCARBON CONVERSION PROCESS AND APPARATUS THEREFOR

Robert D. Drew, Wenonah, N.J., assignor to Socony Mobil Oil Company, Inc., a corporation of New York Original application February 16, 1951, Serial No. 211,238. Divided and this application December 22, 1953, Serial No. 399,744

8 Claims. (Cl. 302—59)

This application is directed to the conversion of hydrocarbons in the presence of a moving mass of solid, particle-form contact material and is more particularly directed to an improved method and apparatus for conveying upwardly granular contact material in a moving bed, hydrocarbon conversion system.

In the petroleum industry many processes are known in which hydrocarbons, at temperature and pressure suitable for conversion, are contacted with a granular solid material in the form of a gravitating column to produce converted products. In these processes, it is necessary to continuously remove the contact material from the bottom of the column and lift it upwardly to a location above the column to complete, eventually, an enclosed cyclic path. Recently, these systems are being modified to incorporate gas lifts, in place of the formerly used bucket elevators, as a means of raising the granular contact material.

Examples of various processes in this industry which necessitate the use of granular contact material are polymerization, isomerization, alkylation, hydrogenation, reforming, dehydrogenation, cyclization, desulfurization and catalytic cracking. This invention will be described in relation to a catalytic cracking process, being understood, however, to apply broadly to any process or operation in which it is desired to lift a solid material in particle-form with minimum particle attrition and erosion of metal. For example, it may be applied to conversion processes wherein hydrocarbons, prepared for conversion, are brought in contact with inert refractory particles, and converted products are removed therefrom. Typical of such processes is the production of ethylene from various gas oils at temperatures in the neighborhood of 1500° F.

In the moving bed system of catalytic cracking, the particles in granular form are contacted with suitably prepared hydrocarbons while gravitating downwardly through a reaction zone in the form of a substantially compacted column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is laid down on the surface of the catalyst, impairing its ability to function catalytically. The coked or spent catalyst is removed from the bottom of the reaction zone continuously and transferred to the top of a gravitating compact column of particles in a regeneration zone. The catalyst gravitating through the regeneration or reconditioning zone is contacted with a combustion supporting gas, such as air, to burn off the coke deposits from the surface of the catalyst. The coke-free or regenerated catalyst is withdrawn continuously from the bottom of the column in the regeneration zone and transferred to the top of the column in the reaction zone, completing the continuous path. This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. Although the cracking conversion is endothermic whereas the regeneration is exothermic, the two reactions may or may not be in substantial balance. The catalyst is lifted, therefore, at temperatures of approximately 800–1200° F., or thereabouts.

As the catalyst material gravitates through the conversion zone, the gas or vapors contact the catalyst surface by passing through the voids between the particles. It is desirable to maintain the flow of gas through the bed uniform for a variety of reasons. For example, channelling of the gas through the reactor causes non-uniform deposition of carbon or coke upon the particles and non-uniform conversion of the reactant charge. The cracking efficiency is materially reduced from that which is obtained when the gas flows uniformly through the bed. Channelling in the regenerator causes the particles passing through the channel to overheat and thereby damage the catalytic activity of these particles. Those particles not receiving their share of combustion supporting gas are not sufficiently regenerated to regain their former cracking activity. In order to provide uniform gas flow and prevent channelling, it is desirable to utilize catalyst particles of generally uniform size and shape, although some irregularity of size of particles is tolerable. For example, they may take the form of pellets, pills, uniform granules and spheres, spheres or beads being preferred. The term "granular" when used in this specification refers broadly to all solid particles of the size range indicated, whether regular or irregular in size or shape. The particle size may range from about 3–100 mesh, Tyler screen analysis, and preferably 4–12 mesh Tyler. The catalytic material may be natural or treated clays such as bentonite, montmorillonite or kaolin or may take the nature of certain synthetic associations of silica, alumina, silica and alumina, with or without various additions of metallic oxides. The particles may also be formed of inert materials such as, for example, mullite or corhart. These materials are well known in the petroleum and related arts, being produced in the form of hard refractory particles having enormous adsorptive surface area in relation to their small particle size. When inert materials are used the particle size may be somewhat larger than 3 mesh Tyler. The particles have a density range of about 20–130 pounds per cu. ft., poured density. That is the density after the particles are poured into a receptacle. The hardness of these particles ranges from about 60–100 hardness index, broadly and 80–100 hardness index, preferred. The hardness index is determined by the following procedure: Clay catalyst—screen a sufficient quantity of catalyst which has been tempered at 1050° F. for 3 hours in substantially dry air atmosphere to obtain 80–100 cc. of particles which pass through a number 3 screen and remain on a number 5 screen. Transfer 80±2 cc. of the particles to an attrition can containing eight steel balls. Rotate the can with its axis in a horizontal position at 80±2 r.p.m. for one hour by means of the roller equipment specified below. Remove the sample from the can and screen over a number 6 screen, weighing the material retained on the screen to an accuracy of ±0.1 gram. The screenings are made by shaking for 10 minutes on a "Ro-tap" or "End-shak" shaking machine using eight inch test screens equipped with cover and pan.

Calculate the hardness index from the following formula:

$$\frac{\text{Weight on No. 6 screen} \times 100}{\text{Weight of No. 3 to No. 5 test sample}} = \text{Hardness index}$$

Special apparatus required:
"Ro-tap" or "End-shak" screen shaker.
Eight inch nested standard testing screens including cover and pan which conform to A.S.T.M. Designation: E11-39.
Attrition can—3½ in. diameter by 3¾ in. long, friction fit lid (i.e. 1 lb. standard grease can).
Eight steel balls, smooth surface $15/16$ in. dia.; $55\pm0.5$ grams weight per ball.
Rotating machine adapted to rotate the can on its side at $80\pm2$ r.p.m.

*Synthetic catalyst modification of procedure*

*Tempering.*—For silica-alumina cracking catalyst, temper for 10 hours in substantially dry air atmosphere at 1400° F.
For chrome-silica-alumina cracking catalyst, temper for 3 hours in substantially dry air atmosphere at 1100° F.

*Size of sample.*—Use $80\pm2$ cc. of particles which pass through a number 3 screen and are retained on a number 8 screen.

*Rolling.*—Same as for clay.

*Rolled sample.*—Screen over a number 9 screen, weighing the material retained on the screen. The procedure followed is the same as for clay catalyst.

$$\text{Hardness index} = \frac{\text{Weight on No. 9 screen} \times 100}{\text{Weight of No. 3 to No. 5 test sample}}$$

Channelling may occur in these systems, even though uniform size particles are used, when catalyst attrition rates become excessive. Attrition involves the breaking or spalling of catalyst particles, usually encountered when the particles impinge on the metal walls of the enclosed system or against themselves, producing much smaller particles called catalyst fines. Fines are caused also by the fact that the particles rub against each other or the metal walls in transit. If the amount of fines in the system builds up too high, a number of difficulties arise, such as, for example, segregation and uneven distribution of fines in the moving beds which causes channelling, increase in pressure drop due to gas flow through the reactor, etc. Hence, catalyst attrition must be avoided or minimized in these moving bed systems.

Recently it has been found desirable to effect transfer of catalyst from one elevation to the other in these cyclic systems by means of pneumatic lifts which replace mechanical elevators formerly employed for this purpose. Unfortunately, initial attempts to transfer catalyst with pneumatic lifts resulted in excessively high catalyst attrition and breakage losses to an extent that made the use of such lifts unfeasible. It has now been discovered that these high attrition losses are cumulative losses from several parts of the pneumatic transfer system. One portion of this system found to cause high catalyst attrition and breakage is that portion wherein the catalyst is separated from the lift gas and caught at the upper end of the pneumatic lift system. While this invention in one form involves an improved cyclic conversion system and an improved pneumatic transfer system as combinations, still in a broad form the invention is particularly concerned with the lift gas-catalyst separation system and the combination thereof with the pneumatic lift.

A major object of this invention is the provision in a cyclic process for conversion of hydrocarbons in the presence of a granular contact material of an improved method and apparatus for transferring the catalyst from one elevation to a higher elevation and for collecting the transferred contact material without excessive attrition or breakage thereof.

Another object is the provision of an improved method and apparatus for the conversion of hydrocarbons in the presence of a granular contact material.

Another object is the provision of an improved method and apparatus for pneumatic transfer of granular solids.

A specific object is the provision in a pneumatic transfer system of an improved method and apparatus for separating the transferred granular material from the carrier gas and for the collection of the separated granular material without excessive attrition and breakage thereof.

Another specific object is the provision of an improved surge hopper for granular contact materials.

Another specific object is the provision of an improved method and apparatus for delivering granular material onto the bed thereof in a confined surge chamber with a minimum of breakage and attrition.

These and other objects of this invention will be made apparent by the following sketches, all highly diagrammatic in form, and the subsequent discussion of the process and apparatus.

Figure 1 shows a continuous moving bed hydrocarbon conversion system incorporating a gas lift as the contact material lifting means.

Figure 2 shows a vertical elevation, in section, of the separator located atop the gas lift.

Figure 3 shows a plan view in horizontal section of the separator as seen on plane 3—3 of Figure 2.

Figure 4 shows a vertical elevation in section of an alternate embodiment of this invention.

Referring now to Figure 1, a complete hydrocarbon conversion system is illustrated. A separator surge vessel 10 is provided which is large enough to serve in a dual capacity, both as a separating or settling means for separating catalyst from lift gas and as a surge hopper to allow for irregularities in catalyst flow through the moving bed system. The conduit 11 serves as an elongated feed leg to transfer the catalyst from the surge hopper 10 into the reaction vessel 13. The reaction vessel may be operated at a pressure which is higher than that of the separator, i.e. 5–30 p.s.i. (gauge), and the catalyst will feed into the vessel through the conduit 11 without valves or restrictions, provided the leg is suitably shaped and sufficiently long. The feed leg must be substantially vertical, thereby requiring a taller gas lift when the pressure differential is increased. A suitable feed leg is shown and claimed in United States Patent 2,410,309.

The catalyst is gravitated through the reactor 13 as a substantially compacted column and contacted therein with hydrocarbons, suitably prepared for reaction, introduced through the conduit 14. The reactants may be in liquid, vapor or mixed liquid and vapor form, preheated, generally to about 700–800° F., although higher or lower temperature may, in certain instances, be used, depending, to some extent, upon the type of charging stock. The hydrocarbons are converted in the vessel upon contacting the catalyst to more desirable materials and the products are removed from the vessel through the conduit 15 to fractionation and processing apparatus, not shown. The spent catalyst is withdrawn continuously from the bottom of the vessel and introduced into a depressurizer 16, usually, where the pressure is reduced practically to atmospheric. This is done, primarily, because it is simpler and more economical to regenerate or restore the material at substantially atmospheric pressure. A suitable depressurizer is shown and claimed in United States Patent No. 2,448,272, which issued on August 31, 1948. Inert gas is introduced into the top of the vessel 13 through conduit 12 and bottom of the vessel 13 through conduit 17 to act as a sealing medium in preventing the escape of reactant fluids from the vessel.

The depressurized catalyst is gravitated downwardly as a compact column through the regenerator or kiln 18 wherein it is contacted with combustion supporting gas and the coke deposits are burned. The catalyst may enter the vessel at a temperature in the neighborhood of 800–900° F., and be removed therefrom at a temperature in the neighborhood of about 1100–1300° F. Temperatures higher than the above heat damage the catalyst, impairing its catalytic activity. Where only a heat carrying medium is required, however, inert refractory particles, such as corhart or mullite, may be used and restored at temperatures well in excess of the above without damage. In order to control the temperature of the kiln, cooling coils may be utilized. Air is introduced into the kiln 18 through the conduit 19 and travels both upwardly and downwardly through the bed, being withdrawn through the conduits 20, 21. A stream of flue gas is taken from the kiln 18 through the conduit 22 to the elutriator 23 located in the catalyst line 26. Fines are removed with the flue gas through the conduit 24 to separation apparatus, not shown, wherein the fines are removed from the gas.

The catalyst is withdrawn from the bottom of the kiln through the conduit 25. The catalyst is depressurized, if necessary, in the vessel 27, which also provides an outlet for lift gas which passes upwardly through the catalyst column in the conduit 28. The catalyst is gravitated downwardly through the conduit 28, which may be a suitably shaped feed leg similar to the reactor feed leg 11, into the top of the lift pot 29. The lift pipe 30 is a suitably elongated substantially vertical tube, preferably of circular cross-section, although other shapes may be utilized. The lift pot 29 is located at the bottom of the pipe and the separator 10 is located at the top of the pipe with the ends of the pipe projected into each vessel. The granular material forms a compact mass of particles around the lower end of the lift pipe 30. Primary lift gas is introduced into the bottom of the lift pot through the conduit 31. The gas is discharged upwardly from a conduit which terminates just below the bottom end of the lift pipe, whereby the primary gas passes directly up the tube without passing through any substantial bed of catalyst. Secondary gas is introduced through the conduit 32 into the lift pot in such a manner that it passes through regions normally occupied by the catalyst bed, when no gas is flowing through the lift, prior to its introduction into the lift pipe. The catalyst flow through the lift pipe can be readily controlled by controlling the secondary lift gas stream. Such a lift pot design is shown and claimed in copending application Serial No. 211,238, filed February 16, 1951, now abandoned.

In this arrangement, the contact material is gravitated downwardly from the separator or settling-surge vessel through the contacting vessel to the feeding vessel as a continuous unobstructed stream. Since the rate of downward movement of contact material can be controlled by adjustment of the rate of secondary lift gas supply, no valve or lock systems are required in the catalyst flow conduits. Inasmuch as such devices cause catalyst attrition as well as mechanical troubles at the elevated temperatures involved, their elimination from the system is an important improvement.

The granular material is discharged from the upper end of the lift pipe 30 into the vessel 10 at a level intermediate the upper and lower ends thereof. The settling surge vessel 10 is shown in more detail in Figures 2 and 3 which should be read together. A horizontal partition plate 41 extends across the vessel 10 so as to divide it into an upper settling chamber 10a and a lower surge chamber 10b. A vertical sleeve 60 extends upwardly from the bottom of the chamber 10b through a circular opening in partition 41 and terminates shortly above the partition. A vertical ring 46 is connected tightly into the circular opening in partition 41 and extends upwardly to a level a short distance (about 2½ feet in one example) above the partition 41. The ring baffle forms the effective upper end of the lift pipe 30 which extends up through sleeve 60 to a level slightly above the upper end thereof. A collar or channel-shaped lip is connected to the upper end of the lift pipe and is sized to overlap the sleeve 60 so as to prevent escape of granular material between the sleeve and the lift pipe. An annular opening 62 through the partition 41 remains between the concentrically arranged lip 61 and ring member 46. Spacer bars 47 are arranged at intervals around the opening and between members 46 and 61. A plurality of pipes arranged in ring groups concentric with the lift pipe extend through the partition 41. The pipes 44 in the outer ring group drop to the lowest level, terminating on their lower ends along a plane spaced above the bottom of the surge chamber 10b and sloping upwardly from the side of the chamber nearest the feed leg 11 (which connects off center into the bottom of chamber 10b for catalyst withdrawal therefrom) to the opposite side of the chamber 10b. The pipes 44 in the middle ring group terminate at equal distances above the same plane but at a higher level and the pipes in the inner ring group terminate at equal distances above the same plane at a still higher level in the surge hopper 10b. In other words, the drop pipes in any ring group terminate at their lower ends in a plane which slopes downwardly from the lower end of the drop pipe in the ring group located furthest away and on the opposite side of the hopper from the feed leg, toward the longest drop pipe in that ring group which is located on the same side of the hopper as the feed leg 11 and nearest the feed leg entrance. While as in this example, the pipes of any group terminate in a flat plane, in a preferred form of this invention they may terminate at equal distances from an imaginary conical surface formed as the locus of revolution around the axis of the leg 11 of an imaginary line having one end fixed at the center of leg 11 at the level of the bottom of surge chamber 10b and sloping upwardly from that point at the angle of repose of the catalyst involved. This angle may vary from 25 to 45 degrees depending upon the particular catalyst, but usually an angle of about 30 degrees with the horizontal is satisfactory. The pipes in each ring group should preferably be equidistant from this conical surface and the corresponding pipes in the several groups should, of course, terminate at different vertical distances above the plane in surge chamber 10b. This latter arrangement applies whether the catalyst outlet from the surge chamber is positioned off center as shown or centrally. It also applies where there are two or more catalyst outlets. In the latter case there will be a similar imaginary cone for each outlet and the pipes in any group are arranged at equal distances above the cone corresponding to the outlet served by those pipes. Also, those pipes located vertically in line with the intersection of the imaginary cones will have their lower terminus determined on the basis of the level of the lines of intersection of the cones.

Returning to Figures 2 and 3, the upper ends of the drop pipes 44 in each ring group terminate in a common horizontal plane above the partition 41, but the several ring groups terminate at different levels above the partition. The pipes in the group extending to the lowest sloping plane level above the bottom of surge chamber 10b terminate the shortest distance above the partition 41. The pipes in the group having lower ends spaced at a plane level furthest above the bottom of the chamber 10b terminate at the highest level above the partition 41. In general, the pipes are so arranged at their upper ends that a line connecting the upper end of any drop pipe with the nearest pipe in the adjacent ring will at least form an angle with the horizontal greater than the angle of repose of the catalyst. This varies from 25–45 degrees but for most cases an angle of about 40–45 degrees will be found satisfactory. For convenience, the upper ends of the drop pipes are terminated in a right conical surface having its axis substantially concomitant with the lift pipe axis and having an apex angle of about 90 degrees.

A gas outlet 42 connects centrally into the top of vessel 10. A cylindrical skirt 40, closed on its upper end is supported a spaced distance below the upper end of the vessel 10 and centrally of its cross-section. The skirt 40 is of smaller diameter than vessel 10 so as to leave an annular passage 65 between the skirt and the vessel 10 through which gas may flow to the outlet 42.

In operation the granular material suspended in lift gas discharges upwardly into the settling chamber 10a where the stream is laterally expanded due to the larger cross-section of chamber 10a as compared with lift pipe 30. As a result the upward catalyst velocity is rapidly decelerated and the catalyst granules settle onto the partition 41. The lift gas escapes through passage 65 to outlet 42. Preferably, the annular passage should be of such cross-sectional area as to cause a gas velocity in the passage 65 which will permit entrainment of fines, i.e., material smaller than about 100 mesh Tyler, while larger particles settle. Thus, a preliminary elutriation is accomplished in passage 65. The granular material forms a pile on partition 41 which slopes upwardly at the angle of repose from the ring group of drop pipes in use. The catalyst flows through the drop pipes, as will be described below, as substantially compact throttled streams and drops onto the surface of a bed of catalyst maintained in the surge chamber 10b.

Throttling orifice discs 45 are placed in the lower end of each pipe to substantially throttle the downward flow of catalyst through the drop pipes below that corresponding to free-flow. The catalyst pile on the partition plate 41 builds up to the level of the outer ring of pipes 44 and spills into the pipes, rapidly forming a compact column therein because of the restricted outlets. The orifices in the discs 45 are sized to permit gravitation therethrough of somewhat less than the normal catalyst flow. For example, it is preferred that the outlet of each ring of pipes be restricted to handle between 50–90 percent of the total normal catalyst flow and preferably 80–85 percent of the flow. Consequently, the level of the catalyst on the partition plate 41 rises to permit the remainder of the catalyst to flow through the next inner ring of pipes. For example, 85 percent of the catalyst may flow through the outer ring of pipes as shown when the surface of the catalyst in the bottom of the vessel 10 is below the lower ends of the outer ring of pipes and 15 percent of the catalyst may then be flowing through the intermediate ring of pipes. Because the outlets of the pipes are restricted, the catalyst passing through the intermediate ring of pipes hangs up momentarily at the outlets. This provides, in essence, two relatively short free-fall drops for this small portion of the flowing catalyst. The bulk of the catalyst, passing through the outer ring of drop pipes, has only the relatively short free-fall from the lower ends of the drop pipes to the surface of the catalyst. The amount of this free drop may be limited as desired by using less or more rings of drop pipes 44 at spaced levels within the surge chamber. When the catalyst level in the surge chamber rises up to or above the lower ends of the outer ring of drop pipes, the flow from these pipes is substantially reduced because the outlets are blocked by the catalyst bed, except to the extent of the downward movement of catalyst in the bed in the projected area directly below the orifice 45. The flow through the intermediate ring then increases to capacity, for example, 80–85 percent of the total flow. The level of the catalyst pile increases, allowing the excess catalyst to pass through the inner ring of drop pipes, resulting in a stable operating condition until the level in the surge chamber rises to the bottom of the intermediate ring of pipes. When the lower ends of the intermediate ring of pipes are covered with catalyst, substantially all the catalyst flow is diverted to the inner ring of pipes.

The lower ends of the pipes are terminated in spaced apart surfaces so located that substantially all the flow of catalyst is downwardly in compact column form to release apertures located just above the surface of the bed of catalyst in the surge zone. The remainder of the flow, which passes through the next ring, is released from outlets located near the surface of the bed. These paths which terminate at the bottom a substantial distance above the bed receive practically none of the catalyst flow because their upper ends project above the surface of the pile of catalyst on the partition plate. If the level of catalyst on plate 41 builds up to an extent where the inner ring group of pipes cannot prevent further bed level increase, then the excess catalyst overflows through the safety overflow opening 62. The ring baffle 46 is, in essence, a single drop pipe and hence, the upper end of the baffle should be so positioned that a line connecting the upper end of any of the inner drop pipes with the nearest point on the upper edge of the baffle slopes at an angle greater than the angle of repose of the contact material, a 40–45 degree slope being satisfactory in most cases.

A level indicator is used to indicate the catalyst level in the surge chamber. Although several indicators are known in the art, the indicator illustrated uses radium sources A, B and C to emanate waves to a receiver 48. The catalyst blocks, at least in part, the transfer of energy from the sender to the receiver, giving a simple, accurate level indicator when the unit is properly calibrated.

It will be understood that the apparatus is, within the scope of this invention, subject to considerable modification from the form specifically disclosed hereinabove. For example, the partition 41 may take a form other than a flat plate. Thus, it may be concave in shape or even conical in shape. In place of the pipes rectangular ducts or members adapted to provide concentrically arranged annular shaped passages may be substituted provided the ends of these members are designed to terminate at the proper levels. The overflow passage 62 and the sleeve 60 and ring members 46 may be omitted where thermal expansion problems are not serious. The arrangement of the gas outlet and baffle 40 may also be modified. Thus, for example, the outlet 42 may be connected into the side of vessel 10 near its upper end and skirt 40 may depend from the top of vessel 10. Also, other forms of baffle member may be interposed in the direct line of flow between the upper end of the lift pipe and the separator gas outlet for the purpose of forcing the gas to take a circuitous route before reaching the gas outlet.

While groups of drop pipes are shown in the example described hereinabove, it is contemplated that in a broad form of this invention, each group may consist of only a single drop pipe. In its broad form, the invention requires the provision of at least two pipes, open on their ends extending through the partition 41, said pipes terminating on their lower ends at different levels spaced above the bottom of the surge chamber 10b and terminating on their upper ends at different levels above the partition (one pipe may be flush with the partition). Preferably, the drop pipes should terminate on their upper ends below the effective upper end of the lift pipe and if not, some provision should be made to prevent catalyst from the bed on partition 41 from flowing back into the lift pipe. The pipe or pipes having their lower end at the lowest level in the surge chamber also have their upper ends at the lowest level above the partition 41. Pipes discharging at progressively higher levels in the surge chamber have their upper ends at progressively higher levels. When groups of pipes are employed to service given levels in the surge chamber, the lower ends of such groups should preferably terminate at equal distances from a sloping plane or curved surface in the manner discussed in detail hereinabove. However, in a less preferred form of the invention, all pipes in each group may terminate at common levels in the surge chamber similarly as they do in the settling chamber. While as stated, the orifices 45 are sized so that each group of drop pipes may handle about 85 percent of the normal catalyst circulation in the cyclic system, it is contemplated that in less preferred forms of the invention each of the orifices may be sized to permit each group to handle 100 percent of the circulation while still restricting the flow rate from the pipes below a rate corresponding to the free-flow rate in the drop pipes. Arrangements may be provided to vary the orifice size at the lower ends of the drop pipes.

While the invention is particularly applicable to pneumatic transfer systems, it is contemplated that in one broad form the invention provides an improved method and apparatus for delivering granular contact material onto a bed thereof in a surge zone without excessive attrition and breakage, regardless of the method of contact material supply to the top of the surge hopper. For example, the contact material might flow into the chamber 10a of Figure 2 from an elevator chute. It is contemplated, of course, that the surge and settling chambers may be in separate vessels instead of within a single vessel as shown.

It will be noted that by the method of this invention a stream of contact material and suspending carrier gas from a lift pipe is caused to laterally expand in the settling chamber whereby the upward velocity rapidly decreases and the granular contact material begins to drop within the settling chamber. A positive hindrance is imposed to the fall of at least a substantial portion of and preferably most of the contact material throughout a substantial portion of the vertical distance between the level where the drop begins and the bed of material in the surge chamber below. For example, as shown in Figure 2, the granular solids pass down through pipes 44 at a rate throttled by orifices 45 so that the flow is as a compact stream. As a result, the granules fall onto the surface of the bed in the surge zone with substantially less force than would be the case if the material were permitted to fall freely the entire distance. While usually the imposition of an impedance on the free-fall of the granules from a level shortly below the upper end of the lift pipe to a level shortly above the bed in chamber 10b is sufficient to restrict attrition and breakage to a feasible minimum, nevertheless, if desired, the fall of the material may be impeded throughout much of the distance between the upper end of the lift pipe and the highest level of material upward travel in chamber 10a. For example, horizontal shelves may be arranged along the sides of the chamber 10a to catch the falling granules and throttled drop pipes may convey the material from these shelves onto the bed in the surge chamber. The shelves on opposite sides of the chamber 10a should be arranged at different levels in order to avoid too much restriction of the area for gas flow in the settling chamber at any one level. This embodiment is shown on Figure 4. The shelves 75 are in the form of horizontal sectors of annular rings located on alternate sides of the inner periphery of the vessel 10 at spaced levels above the upper end of the lift pipe 30. The particles issue from the lift pipe in the form of a fountain and are caught near the upper end of their travel on the shelves, forming piles of catalyst thereon. The major portion of this catalyst is gravitated downwardly through the drop pipes 76 to a discharge level just above the level of the bed 10b in the bottom of the vessel 10. The orifice plate 77 in the bottom ends of the drop pipes 76 are sized to maintain the solids in the drop pipes 75 in substantially compact columnar form. The gas is withdrawn from the top of the vessel between the baffle 40 and the vessel walls and then discharged through the conduit 42.

In order to further restrict catalyst attrition at the upper end of the lift pipe, the velocity of the catalyst discharged upwardly therefrom may be limited. This will restrict the height to which the catalyst rises above the partition 41. It has been found that substantial reduction of attrition may be insured by limiting the average catalyst velocity at the upper end of the lift between about 5–35 feet per second and preferably within the range 10–25 feet per second. This velocity reduction may be effected by using a suitably tapered pipe, which allows the gas velocity to reduce in the upper portion of the lift pipe with a consequent deceleration of the catalyst particles. This may also be accomplished by withdrawing gas through withdrawal conduits at spaced locations along the upper portion of the lift pipe. These features are shown in more detail and claimed in copending applications for Letters Patent Serial Number 210,942, filed February 14, 1951, now Patent Number 2,770,504, November 13, 1956, and Serial Number 211,344, filed February 16, 1951, now abandoned. As indicated in these cases, a catalyst velocity in the lower portion of the pipe which may be higher than that desired at the top is essential to prevent high catalyst attrition in the lift pipe and inefficient operation of the lift. It will be understood that the present invention is not restricted in its broader aspects to reduction of the catalyst velocity at the top of the lift in the manner above discussed, but operation in that manner is preferred. In general, it is preferable also to provide sufficient impedance to the catalyst drop to prevent its striking the bed surface in the surge zone at a velocity in excess of about 34 feet per second.

Turning to the operating conditions in the lift pipe, it may be stated that, in general, the catalyst velocity and gas velocity in the lift for smooth lifting will depend, to some extent, upon the physical dimensions of the lift, the height being a controlling factor. The catalyst equilibrium velocity may range from say 5–75 feet per second, being lower for short lifts. The catalyst equilibrium velocity is the difference between the actual gas linear velocity, at any given location in the lift pipe, and the catalyst terminal velocity. The catalyst terminal velocity depends on the catalyst density, form and shape, and upon the particular lift gas and also the temperature and pressure conditions involved. The catalyst terminal velocity for any given condition can be calculated from equational relationships or estimated from data which are available in the public literature. It may also be determined by routine experimental methods, well known in the art. The values of catalyst equilibrium velocities referred to herein are those values in the lower end of and in the inside region of the lift pipe. For a small lift about 40 feet tall and 3 inches inside diameter, the equilibrium catalyst velocity may range from about 5–50 feet per second, whereas for a large lift about 200 feet tall and 17 inches inside diameter, the equilibrium catalyst velocity may range from about 35–75 feet per second. In general, the gas velocity will range from about 30–150 feet per second, being about 30–120 feet per second for the small lift and 70–150 feet per second for the large lift, previously described. The catalyst density in the lift pipe may vary over a wide range, depending upon the physical dimensions of the pipe and being adjusted by the control of relative rates of flow of primary and secondary lift gas. In general, the density is controlled in lifts having other feeding arrangements by control of the relative amounts of gas and catalyst entering the lower end of the lift pipe by one means or another. Densities up to about 3 pounds per cubic foot are found satisfactory for the large lift pipe, whereas densities up to about 15 pounds per cubic foot are found satisfactory for the small lift pipe, although densities higher than those enumerated are not excluded.

The following is an example of a typical commercial application of this invention:

In a moving bed cracking system having a nominal catalyst circulation rate of 360 tons per hour, synthetic silica-alumina-chromina beads of approximately ⅛–¼ in. diameter and about 85 hardness index, and cracking capacity of 10,000–15,000 bbls. per stream day, the following dimensions are satisfactory for the apparatus:

Lift pipe height _____ 237 ft.
Lift pipe internal diameter at bottom _____ 25.6 in.

| | |
|---|---|
| Lift pipe internal diameter at top | 42.31 in. |
| Separator height | 35 ft. 2 in. |
| Separator inside diameter | 14 ft. |
| Distance lift pipe projects into separator | 17 ft. 1.25 in. |
| Location of partition plate above bottom of separator | 16 ft. 2.5 in. |
| Inside diameter of ring barrier | 52.31 in. |
| Number of pipes in each ring | 12. |
| Diameter of outer ring | 12 ft. |
| Diameter of intermediate ring | 10 ft. |
| Diameter of inner ring | 8 ft. |
| Nominal diameter of drop pipes | 8 in. |
| Diameter of discharge orifice in drop pipes | 4.5 in. |
| Distance outer ring projects above partition plate | 1 in. |
| Distance intermediate ring projects above partition plate | 1 ft. 4 in. |
| Distance inner ring projects above partition plate | 2 ft. 6 in. |
| Distance barrier projects above partition plate | 3 ft. |
| Distance shortest pipe in outer ring projects below partition plate | 5 ft. 6 in. |
| Distance shortest pipe in intermediate ring projects below partition plate | 3 ft. |
| Distance shortest pipe in inner ring projects below partition plate | 4 in. |
| Angle formed by the intersection of the plane which contacts the lower end of each drop pipe in each ring and the horizontal plane | 30 degrees. |
| Withdrawal aperture diameter | Approx. 15 in. |
| Location of withdrawal aperture | Substantially below the longest drop pipe in the outer ring—5 ft. 2.5 in. from the center of the lift pipe. |
| Nominal flow through withdrawal aperture | 350 tons/hour. |
| Nominal flow withdrawn for elutriator drag stream | 10 tons/hour. |

It will be understood that the invention is not intended to be restricted to the specific examples of structure, or operation and application given hereinbefore and it is intended to cover all changes and modifications of the examples of the invention herein chosen for purposes of disclosure which do not constitute departures from the spirit and scope of the invention.

This is a division of previously filed application Serial Number 211,238, filed February 16, 1951, now abandoned.

I claim:

1. In a moving bed hydrocarbon conversion system in which a granular contact material is gravitated as a compact column through at least one contacting vessel and the particles are conveyed upwardly through an open-ended, upwardly-extending lift pipe, an improved separator comprising in combination: a vertical vessel positioned about the upper end of the lift pipe, the lift pipe being terminated intermediate the top and bottom of the vessel, a partition across said vessel at a level below the point of introduction of the granular material, adapted to divide the vessel into an upper settling chamber and a lower surge chamber, at least one aperture in said partition arranged to permit the flow of excess granular material fro msaid partition into the surge chamber in an amount sufficient to prevent the level of solids on said partition from rising to a level which would cause solids to flow back into said lift pipe, a plurality of conduits open on their ends extending through said partition, said conduits terminating on their lower ends at a series of different levels spaced above the bottom of said surge chamber and on their upper ends at a series of different levels spaced above said partition in said settling chamber but below the level of the upper end of said lift pipe, the conduits terminating at the lowest levels in said surge chamber also terminating at the lowest levels above said partition in said settling chamber, means associated with the lower ends of said conduits, adapted to restrict the discharge of granular material from said conduits, means to withdraw gas from the upper portion of said vessel and means to withdraw granular material from the bottom of said vessel.

2. In a moving bed hydrocarbon conversion system in which a granular contact material is gravitated as a compact column through at least one contacting vessel and the particles are conveyed upwardly through an open-ended, upwardly-extending lift pipe, an improved gas-solids separator comprising in combination: a vertical settling-surge vessel positioned about the upper end of the lift pipe, the lift pipe being terminated intermediate the top and bottom of the vessel, a substantially horizontal partition located intermediate the top and bottom of the vessel, so as to divide it into an upper settling chamber and a lower surge chamber, several groups of pipes projected through the partition, means defining at least one withdrawal outlet in the bottom of the vessel, the groups of pipes terminated at their lower ends at spaced-apart levels, the pipes of each group being terminated substantially equal distances above an imaginary surface formed by intersecting inverted right cones whose apexes are located at the center of the withdrawal outlets on the bottom of the vessel and whose substantially equal apex angles are between about 90 and 130 degrees, said groups of pipes being terminated at their upper ends at spaced-apart levels, the pipes of each group being terminated substantially equal distances above the partition, the upper ends of the group of pipes projected downwardly to the lowest level being terminated at the lowest level above the partition, the upper ends of the group of pipes projected downwardly to the highest level being located at the highest level above the partition, the upper end of each pipe located relative to the nearest pipe in the group which terminates at a level just above and also relative to the nearest pipe in the group which terminates at a level just below such that a line connecting the upper ends of the pipes forms an angle of about 45 degrees with the horizontal, orifice plates located at the bottom of each vertical pipe, adapted to throttle the flow of solids therethrough, and means for withdrawing gas from the upper portion of said vessel.

3. In a moving bed hydrocarbon conversion system in which a granular contact material is gravitated as a compact column through at least one contacting vessel and the particles are conveyed upwardly through an open-ended, upwardly-extending lift pipe, an improved gas-solids separator comprising in combination: a vertical settling-surge vessel positioned about the upper end of the lift pipe, having a substantially circular cross-section which is substantially greater than the cross-section of the lift pipe, the lift pipe being generally concentric with the circular separating vessel, the upper end of the lift pipe being terminated at a location intermediate the top and bottom of the vessel, means for withdrawing lift gas from the upper portion of the vessel, a substantially horizontal partition plate in said separating vessel located about the lift pipe near the upper end thereof, said lift pipe being projected through a central aperture in said partition plate which is substantially concentric with the pipe but of somewhat larger diameter, several groups of substantially vertical drop pipes projected through the partition plate arranged in rings substantially concentric with the lift pipe, each ring of pipes being formed of the same number of pipes of substantially the same cross-section, each ring of pipes being substantially equally distributed about the lift pipe, an outlet conduit attached to the bottom of the vessel located adjacent the lift pipe, the lower ends of each ring of pipes terminating in plane surfaces which are spaced-apart substantially equal vertical distances, the plane surfaces sloping upwardly from locations above the withdrawal aperture in the bottom of the vessel toward the lift pipe at an angle with the horizontal of about 25–45 degrees, the outer ring of pipes being projected downwardly below the partition plate to the lowest level and the inner ring being projected downwardly to the highest level, the upper ends of the drop pipes being projected upwardly to substantially contact a surface formed by a right cone having an apex angle of about 90 degrees and having its axis substantially concomitant with the axis of the lift pipe, orifice plates at the lower end of each of the pipes, adapted to throttle the flow of solids therethrough, a circular baffle wall attached about the hole in said partition plate and projected upwardly to a location above the highest projected ring of pipes, whereby the major portion of the granular contact material flows through the ring of pipes which terminates just above the surface of the bed of contact material in the surge section of said vessel and the granular material is lowered to said bed with minimum attrition.

4. In a moving bed hydrocarbon conversion system in which a granular contact material is gravitated continuously through at least one contacting zone as a compact mass and is conveyed upwardly in a stream of rapidly moving gas through an upwardly-extending, open-ended lift passage and discharged upwardly therefrom into a separation zone of enlarged cross-section, the improved method of settling the contact material which comprises the steps: catching the falling contact material in said separation zone on a pile of said material maintained just below the level of the upper end of said lift passage, gravitating the granular material downwardly as substantially compact columns through at least some of a multiplicity of passages which terminate in said separation zone at various levels below the pile of material in said zone, maintaining the surface of a bed of the contact material in the lower portion of the separation zone and maintaining a continuous compact column of said material from the surface of said bed down through at least one of the contacting zones, maintaining the major portion of the granular material flow downwardly from said pile of granular material in said separation zone through passages which terminate just above the surface of the bed of granular material in the lower portion of said separation zone, and diverting the flow of granular material from previously used passages in response to a change in level of the surface of the bed in the lower portion of said separation zone to passages which terminate just above the new level of the surface of the bed of granular material in the lower portion of said separation zone, whereby particle breakage in the settling step is minimized.

5. In a system wherein a granular material is transferred pneumatically up through a substantially vertical lift pipe by means of a lift gas, the improvement comprising: an elongated, closed vessel surrounding the upper end of said lift pipe so that the upper end of the lift pipe is at an intermediate level along said vessel, a partition across said vessel near the upper end of said lift pipe dividing it into an upper settling chamber and a lower surge chamber, means associated with said partition for draining excess granular material from said partition in an amount sufficient to prevent said material from flowing back into said lift pipe, at least two pipes, open on their ends extending through said partition, said pipes terminating on their lower ends at different levels above the bottom of said surge chamber and terminating on their upper ends at different levels spaced above said partition, the pipes having their upper ends at the highest level above said partition also having their lower ends at the highest level in said surge chamber and the pipes having their upper ends nearest the level of the partition also having their lower ends at the lowest level in said surge chamber; throttling means associated with the lower ends of each pipe, whereby granular material is gravitated in compact form from said partition and attrition is thereby minimized, means to withdraw lift gas from the upper section of said vessel and means to withdraw contact material from the lower end thereof.

6. In a system wherein a granular material is transferred pneumatically up through a substantially vertical lift pipe by means of a lift gas, the improvement comprising: an elongated, closed vessel surrounding the upper end of said lift pipe so that the upper end of the lift pipe is at an intermediate level along said vessel, a partition across said vessel near the upper end of said lift pipe dividing it into an upper settling chamber and a lower surge chamber, at least two pipes, open on their ends extending through said partition, said pipes terminating on their lower ends at different levels above the bottom of said surge chamber and terminating on their upper ends at different levels spaced above said partition, the pipes having their upper ends at the highest level above said partition also having their lower ends at the highest level in said surge chamber and the pipes having their upper ends nearest the level of the partition also having their lower ends at the lowest level in said surge chamber, means to withdraw lift gas from the upper section of said vessel, means to withdraw contact material from the lower end of said vessel, a sleeve surrounding the upper end of said lift pipe attached at its lower end to the vessel and terminated at its upper end near the top end of the pipe, the sleeve adapted to restrict lateral movement of the lift pipe in the vessel while permitting relative vertical movement of the pipe whereby thermal stresses are relieved, a channel-shaped lip on the upper end of the lift pipe which is adapted to cover the upper end of the sleeve, means defining an aperture in said partition larger than the outside diameter of the channel-shaped lip, a ring baffle attached to said partition about said aperture, said baffle projected above the partition to a level such that lines connecting the upper ends of the highest level of pipes with the nearest point of contact with the upper end of the baffle are about 45 degrees, a multiplicity of substantially vertical spacer bars attached to and substantially equally distributed about the interior of the baffle, adapted to furnish a guide for the lip of the lift pipe, whereby a safety overflow space is provided between the lift pipe and ring baffle of substantially annular cross-section through which the granular material can pass to the surge chamber.

7. An improved apparatus for pneumatic transfer of a granular contact material comprising: a lift pot adapted to confine a bed of contact material, conduit means to supply contact material into the upper section of said lift pot, a lift pipe directed substantially vertically upward from a location within said lift pot and below the surface of the bed therein, a separating vessel attached about the top of the lift pipe having a substantially circular cross-section which is substantially greater than the cross-section of the lift pipe, the lift pipe being generally concentric with the circular separating vessel, the upper end of the lift pipe being terminated at a location intermediate the top and bottom of the vessel, means for introducing a lift gas into the lift pot whereby the contact material is suspended and lifted up the pipe, means for withdrawing lift gas located in the upper portion of the separating vessel, a substantially horizontal partition plate in said separating vessel located about the lift pipe near the upper end, said lift pipe being projected through a hole in said partition plate which is substantially concentric with the pipe but of somewhat larger diameter, several groups of substantially vertical drop pipes projected through the partition plate arranged in rings substantially concentric with the lift pipe, each ring of pipes being formed of the same number of pipes of substantially the same cross-section, each ring of pipes being substantially equally distributed about the lift pipe, an outlet conduit attached to the bottom of the separating vessel located adjacent the lift pipe, the lower ends of each ring of pipes terminating in plane surfaces which are spaced-apart substantially equal vertical distances, the plane surfaces sloping upwardly from a location above the withdrawal aperture in the bottom of the vessel toward the lift pipe at an angle with the horizontal of about 25–45 degrees, the outer ring being projected downwardly below the partition plate to the lowest level and the inner ring being projected downwardly to the highest level, the upper ends of the drop pipes being projected upwardly to contact a surface formed by a right cone having an apex angle of about 90 degrees and its axis substantially concomitant with the axis of the lift pipe, a circular baffle wall attached about the hole in said partition plate and projected upwardly to a location above the highest projected ring of pipes, and substantially identical orifice plates attached at the lower end of each drop pipe adapted to restrict the flow of contact material therethrough.

8. In a system wherein a granular material is transferred pneumatically up through a substantially vertical lift pipe by means of a lift gas, the improvement comprising: an elongated, closed vessel surrounding the upper end of said lift pipe so that the upper end of the lift pipe is at an intermediate level along said vessel, a partition across said vessel near the upper end of said lift pipe dividing it into an upper settling chamber and a lower surge chamber, at least two pipes, open on their ends extending through said partition, said pipes terminating on their lower ends at different levels above the bottom of said surge chamber and terminating on their upper ends at different levels spaced above said partition, the pipes having their upper ends at the highest level above said partition also having their lower ends at the highest level in said surge chamber, a sleeve surrounding the upper end of said lift pipe attached at its lower end to the vessel and terminated at its upper end near the top end of the pipe, the sleeve adapted to restrict lateral movement of the lift pipe in the vessel while permitting relative vertical movement of the pipe whereby thermal stresses are relieved, a channel-shaped lip on the upper end of the lift pipe which is adapted to cover the upper end of the sleeve, means defining an aperture in said partition larger than the outside diameter of the channel-shaped lip, a ring baffle attached to said partition about said aperture, said baffle projected above the partition to a level such that lines connecting the upper ends of the highest level of pipes with the nearest point of contact with the upper end of the baffle are about 45 degrees, a multiplicity of substantially vertical spacer bars attached to and substantially equally distributed about the interior of the baffle, adapted to furnish a guide for the lip of the lift pipe, whereby a safety overflow space is provided between the lift pipe and ring baffle of substantially annular cross-section through which the granular material can pass to the surge chamber, means to withdraw lift gas from the upper section of said vessel and means to withdraw contact material from the lower end of said vessel.

References Cited in the file of this patent
UNITED STATES PATENTS

| | | |
|---|---|---|
| 2,561,409 | Ardern | July 24, 1951 |
| 2,624,695 | Ivey | Jan. 6, 1953 |
| 2,628,188 | Kirkbride | Feb. 10, 1953 |
| 2,666,731 | Bergstrom | Jan. 19, 1954 |
| 2,669,540 | Weinrich | Feb. 16, 1954 |